D. L. TAYLOR.
SPEED INDICATING AND LIGHTING MEANS FOR VEHICLES.
APPLICATION FILED JUNE 22, 1916.
1,356,097.
Patented Oct. 19, 1920.
Fig. 1.
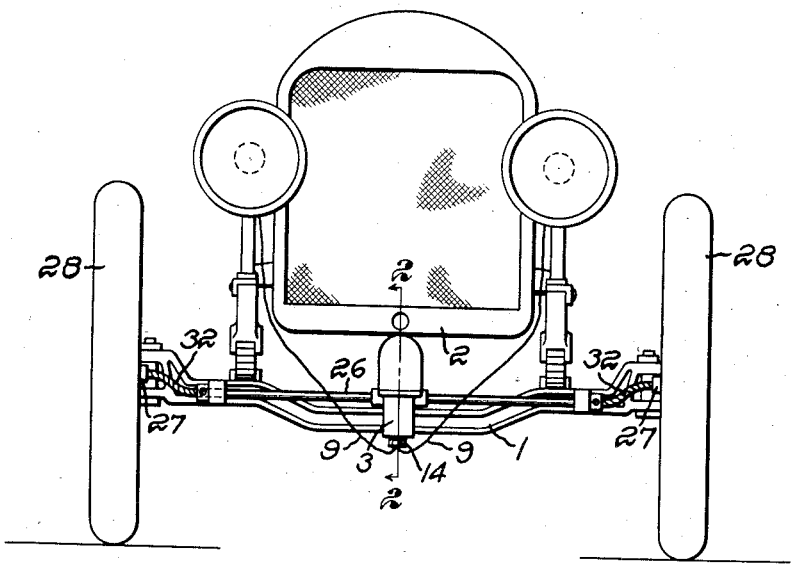
Fig. 2.
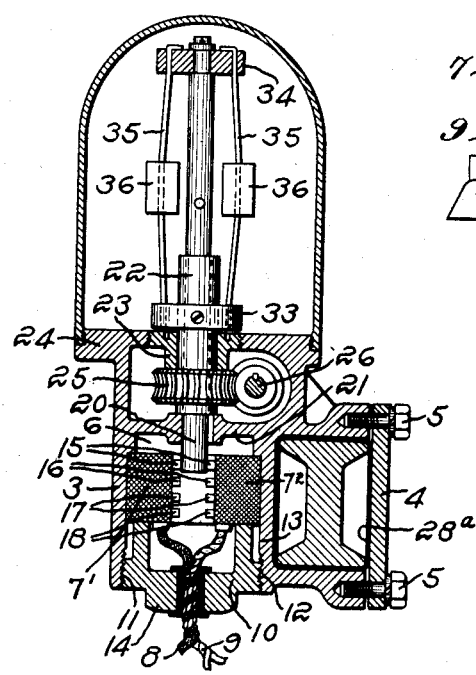
Fig. 4.
Fig. 3.
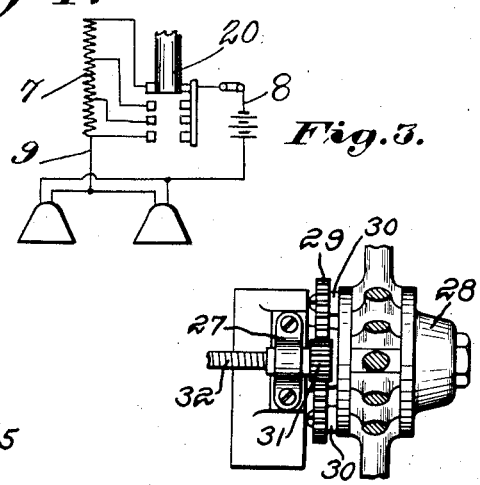
Inventor:
Daniel L. Taylor,
by Emery, Booth, Janney & Varney
Attys.

UNITED STATES PATENT OFFICE.

DANIEL L. TAYLOR, OF BOSTON, MASSACHUSETTS.

SPEED-INDICATING AND LIGHTING MEANS FOR VEHICLES.

1,356,097.     Specification of Letters Patent.     Patented Oct. 19, 1920.

Application filed June 22, 1916. Serial No. 105,307.

*To all whom it may concern:*

Be it known that I, DANIEL L. TAYLOR, a citizen of the United States, and a resident of Boston, county of Suffolk, and Commonwealth of Massachusetts, have invented an Improvement in Speed - Indicating and Lighting Means for Vehicles, of which the following description, in connection with the accompanying drawings, is a specification, like characters on the drawings representing like parts.

This invention relates to combined speed indicating and lighting means for vehicles. It is particularly adapted for use in motor vehicles and designed to automatically increase and decrease the brilliancy of the light as the speed of the car varies and circumstances require, and to thus also in general indicate the speed of the car.

For the better understanding of my invention, I have illustrated one embodiment thereof in the accompanying drawing wherein—

Figure 1 is a side elevation of the device in position on an automobile;

Fig. 2, a partial vertical cross-section,

Fig. 3, a detail on an enlarged scale of the vehicle wheel engaging member, and

Fig. 4 is a diagrammatic view showing the circuit connections.

It is common at present, in the use of electric lights on motor vehicles, which is becoming daily more general, to take the current for the lights from a battery, usually a storage battery. Accordingly the lights are of substantially even brilliancy at all times whether the car is running slowly or fast, and even when not running, unless actually turned off.

Now it is desirable to have a stronger light when the car is moving fast than when it is running slowly, to light the road for a greater distance ahead, but much current may be saved by decreasing the brilliancy of the light when the speed of the car is checked and when the car is standing. My invention provides means for automatically reducing the brilliancy of the lights under these circumstances.

To effect this result, I have conceived the following novel means.

At any convenient point, Figs. 1, 2, as the front axle 1 of the vehicle 2, I mount a suitable rheostat or current controlling means housing 3, and it may be conveniently secured as by a plate 4 and screws 5 to the axle.

The housing is provided with a chamber 6 to receive any suitable rheostat, switch, or other current controlling and distributing means, as for instance a receiving member 7', a distributing member 7², between which a slidable contact moves, as will be described later on, with wires 8, 9, leading to and from said members 7', 7² respectively, and connected with the battery or other source of electricity, not shown, and light bulbs, also not shown.

The rheostat, as stated, may be of any suitable construction and be provided with any convenient form of switch and contacts for regulating the strength of the current delivered therefrom to the lighting system.

The rheostat may be suitably supported upon a base 10 threaded at its lower edge 11 for engagement with the threaded edge 12 of the wall 13 permitting ready removal of the same by application of a wrench to the nut 14 formed on the base.

In order that the current may be regulated automatically by the speed of the car, I have shown the rheostat as provided with a plurality of pairs of conveniently positioned contacts 15, 15, 16, 16, 17, 17, 18, 18, one contact of each pair on each of the receiving and distributing members 7' and 7² respectively arranged to be progressively engaged in pairs by a sliding contact 20, to thereby cumulatively increase the strength of the current passing from the battery by means of the wire 8 to the wire 9 leading to the lights.

The contact 20 extends downwardly through the web 21 of the housing and is carried by the hollow shaft 22 having a bearing in the sleeve 23 in the top 24 of the housing. The shaft 22 carries a gear 25 thereon, preferably of fiber or other insulating material, by means of which the shaft 22 is connected with a shaft 26 extended longitudinally of the axle 1 and the sleeve 23 is threaded into the top 24 to permit removal of the shaft 22 and gear 25 if desired.

The shaft 26 may be conveniently carried by the axle 1 as by means of clips 27 and at one or both ends suitably and flexibly connected with a moving vehicle member as the wheel 28.

For effecting this connection, the vehicle wheel 28 may carry at its inner face a spur gear wheel 29, suitably secured thereon, as by posts 30, and adapted to mesh with a pinion 31 on the end of the flexible shaft 32 connected in turn with the shaft 26. By this means it is obvious that motion of the wheel 28 will transmit motion to the shaft 22, and that the speed of the latter will vary in proportion to the speed of the former. The housing 3 should be properly insulated from the axle 1 by any suitable material 28ª, Fig. 2, and the contact 20 should be insulated from the shaft 26, as stated, making the gear 25 of insulating material, as fiber; or the shaft 26 may be insulated from the housing 3 and its container member in any other convenient manner.

For regulating, within certain limits, the intensity of the current supplied by the line 8 through the rheostat 7 to the line 9 and lights thereon, I have, as stated, movably mounted the contact member 20 in the hollow shaft 22, and the contact 20 and shaft 22 carry a governor of any common type comprising a collar 33 on the shaft, a similar collar 34 on the upper end of contact 20 and connected to the collar 33 by flexible wires 35 or other members secured thereto and carrying weights 36, 36.

The first and upper pair of contacts 15 are preferably designed to convey to the slidable contact 20 a minimum quantity of current, such as would be required ordinarily when the car is temporarily standing still or moving at the minimum speed usually permitted in crowded thoroughfares, for instance, eight miles per hour, while the receiving member 7' is intended to be normally supplied with the maximum quantity of current from a suitable source, not shown. The next pair of contacts 16 below, may be constructed to carry a definite additional number of watts, and each of the remaining pairs of contacts cumulatively, a stated additional quantity as may be desired.

Obviously, when the car is standing or running slowly, the current supplied will give a light of a desired minimum brilliancy, and as the speed of the car increases, making desirable a stronger light, the governor weights, previously adjusted to that end, will, as they move outward, automatically force the movable contact 20 downward as the speed increases, to the previously determined extent, successively into engagement with the contacts 16, 17, 18,— each pair of contacts permitting an increase in the strength of the current delivered to the wire 9 and lights connected therewith by a predetermined amount.

As the speed decreases, the opposite action takes place and when the car stops, the current is automatically reduced to that normally passing through the contacts 15, 15, furnishing all that is necessary under such circumstances.

Having described herein one embodiment of my invention which, however, may obviously be modified in many details without departing from the spirit of the invention, I claim:

1. Current distributing means comprising a housing having means for securing it to a vehicle, a rheostat chamber therein containing a rheostat, a current supplying and a current distributing connection therefor, a gear chamber adjacent the former chamber, a shaft carrying a gear in the gear chamber, a flexible shaft in said chamber with a gear thereon in mesh with the first named gear, said flexible shaft connected with a vehicle wheel, a governor on the gear shaft carrying a contact member and controlling the travel thereof, relative to the rheostat.

2. Current controlling means comprising the housing 3, having a rheostat chamber 6, the connections 8, 9 therefrom to a source of current and illuminating means respectively; a threaded base 10 for the rheostat, a governor and movable contact shaft 20 with the sleeve 22 thereon carrying the gear 25 and governor 33, all mounted on the base 23, threaded into the housing 3; the operating shaft 26 connecting the gear 25 with a vehicle wheel.

In testimony whereof, I have signed my name to this specification.

DANIEL L. TAYLOR.